United States Patent Office 3,275,453
Patented Sept. 27, 1966

3,275,453
MILK-CURDLING ENZYME ELABORATED BY
ENDOTHIA PARASITICA
Joseph L. Sardinas, Gales Ferry, Conn., assignor to Chas. Pfizer & Co., Inc., New York, N.Y., a corporation of Delaware
No Drawing. Filed Apr. 21, 1964, Ser. No. 361,532
3 Claims. (Cl. 99—116)

This application is a continuation-in-part of applications, Serial No. 205,853, filed June 28, 1962, now abandoned, and Serial No. 277,697, filed May 3, 1963, and also now abandoned.

The present invention relates to a new and useful enzyme and to a method for its production. Furthermore, it relates to the use of this new enzyme in an improved method for curdling milk. This milk-curdling enzyme has been found to be particularly applicable to the preparation of cheese, which is characterized by excellent texture, taste and flavor-stability properties.

In the classical method for making cheese, rennet, an enzyme-containing preparation has been used for many years. Rennet is added to milk and the enzyme, rennin, exerts a mildly proteolytic action on the casein and other proteins present. This breakdown of protein causes the solids in the milk to coagulate and the milk is said to have curdled. The solid curds are then freed from a predominantly aqueous low solids content suspension, whey, and are then mixed with salt, then are formed into blocks or rounds and finally are cured to form cheese.

Rennet is prepared from the fourth stomach of milk-fed calves. Since it is derived from a source of supply which varies seasonally and in total number, rennet is subject to wide price fluctuations. While rennet is eminently suitable for use in making cheese, its history of variable price and availability has prompted many investigators to seek a substitute material.

The prior art contains many references to vegetable and microbial enzyme preparations. Some of these curdle milk fully as effectively as the enzyme present in rennet preparations. However, until now all cheeses made from these preparations have been observed to develop off-flavors, usually characterized as bitter, during the required natural aging processes which commonly require from about 1 month to about 1 year. These flavors are believed to develop from the residual, somewhat strong proteolytic activity of the enzymes substituted for rennin.

The desirability of freeing the cheesemaker from his dependence on an animal source of supply has prompted the screening of hundreds of microorganisms to determine if any elaborates an enzyme which would curdle milk as rapidly as rennin, which would have a level of protease-activity substantially equivalent to that of rennin and which would not contribute to the development of a characteristic bitter flavor in cheese after curing periods of up to about one year.

It has now been found that strains of *Endothia parasitica* elaborate such a desirable mildly-proteolytic, milk-curdling enzyme. This enzyme can be used in place of all or part of the animal rennin in standard cheese-making processes and is fully equivalent to rennin in clotting time, desired protease activity, and in freedom from the development of off-flavors and bitter taste in the cheese during storage. Special mention is made of the surprising fact that the novel enzyme of this invention has been found to accelerate aging of Cheddar cheese, when compared with rennin. For example, some of the Cheddar cheeses made with the instant enzyme have a tangy, but clean and mild flavor with long body after only 9 months of aging; in contrast, 18 months of aging is ordinarily required to reach the same stage of cure when animal rennin is used. The instant enzyme can be used advantageously with rennin also, if desired, the rennin providing the clotting activity and the instant enzyme providing the accelerated aging effect.

It is, therefore, a principal object of the present invention to provide an improved means for clotting milk, which means is independent of an animal source of supply.

It is a further object of the instant invention to provide an improved means for preparing cheese, independent of an animal source of supply of rennin, which means provides cheese of uniform quality, excellent taste, and freedom from the development of off-flavors during curing.

It is still another object of the instant invention to provide a means to obtain fully cured cheese with less expenditure of time than has generally been possible heretofore.

These and other objects readily apparent to those skilled in the art may be easily achieved by practice of the process of the present invention which in essence comprises: In a process for making cheese including the step of preparing curds from milk, the improvement which comprises substituting for all or part of the rennin in said step the milk-clotting enzyme elaborated by a strain of *Endothia parasitica*.

The instant invention contemplates a mildly proteolytic, milk-curdling enzyme characterized (a) by being water soluble; (b) by being non-dialyzable; (c) by having its milk-clotting ability destroyed by heating to about 60° C. for five minutes; (d) by having maximum stability at a pH of about 4.5; (e) by being precipitable from an aqueous solution thereof by ammonium sulfate; and (f) by having an ionic electric point of about 5.5.

In addition, there is contemplated a process for producing the said mildly proteolytic, milk-curdling enzyme of this invention, which comprises inoculating a medium containing sources of carbohydrates, nitrogen and inorganic salts with a fungus of the species *Endothia parasitica*, allowing aerobic fermentation to take place until a substantial amount of said enzyme is produced, and thereafter recovering the so produced enzyme from the fermentation medium.

To aid the public in the practice of the instant invention, in one of its embodiments, a culture of one of the especially preferred strains of the microorganism elaborating the milk-clotting enzyme of the instant invention has been placed on deposit in the American Type Culture Collection, Washington, D.C. and designated ATCC 14729. Other strains of *Endothia parasitica* organism which may be used to obtain the instant enzyme and to practice this invention are obtainable by the public from: Centralbureau voor Schimmelculture, Baarn, Holland, six strains designated: Luino; Brescia; Angera III; Luino-xanthostroma; CBS 36 and CBS 54, respectively, and from Commonwealth Mycological Institute, Kew, England, the strain designated CMI 59815.

Strain ATCC 14729 of the new organism after 7 days of growth on a potato dextrose agar medium, has a surface color substantially similar to Ridgway's Cadmium Yellow; reverse color, Ridgway's Orange-Chrome. After 40 days of growth, both surface and reverse have the same color: between Orange-Chrome and Orange-Rufus on the Ridgway color standards chart.

It is to be understood that in the practice of the improved process of the instant invention, limitation to the aforesaid organism is not intended. It is specifically desired and intended to include subcultures, natural mutants, transduced derivatives, variants and the like, and mutants artificially produced from the aforesaid organisms by various means such as irradiation with X-rays or ultraviolet light, treatment with nitrogen mustards, and the like.

The organism is maintained on potato dextrose agar (PDA) and can be grown in a medium containing a source of carbohydrate, nitrogen and inorganic salts. In a particularly preferred inoculum medium, which will be described in the detailed examples, there are present, among other ingredients, a hydrolyzed casein derivative, yeast extract, starch, iron, zinc, manganese, copper, cobalt and boron in controlled amounts.

The inoculum is prepared by growing it in the medium on a rotary shaker at 28° C. in the presence of air for from about 3 to 5 days during which time, good growth is observed to occur. However, as is obvious to those skilled in the art, other commonly employed techniques and media for the preparation of such inocula may be used.

The milk-curdling enzyme of the instant invention is obtained by transferring the inoculum to a sterile medium which will be exemplified in detail hereinafter. This medium contains sources of carbohydrates, nitrogen and inorganic salts. It can contain, among other ingredients, soybean meal, glucose, nitrates, phosphates, sulfates, sodium, potassium and magnesium. It also contains milk, preferably in a concentration of about 10 g./l.

It is preferred, but not critical, to use 5% of the inoculum based on the growth medium and to conduct the fermentation at 28° C. with an air flow of about 0.5 volume of air per volume medium per minute while the suspension is being rapidly stirred at about 1700 r.p.m. After about 48 hours, it is found that the pH, which initially is about 6.8, has dropped to from about 6.0 to about 6.5 and that about 0.5 ml. of the broth will curdle about 5.0 ml. of milk within from about 2 to about 3 minutes.

Of course, as is obvious to those skilled in the art, other techniques and conditions can be employed for causing this organism to elaborate substantial quantities of the instant milk-curling enzyme, and fermentation conditions such as time, temperature, and hydrogen ion concentration may be varied broadly without departing from the scope of the invention.

The enzyme can be used, after appropriate concentration of the broth, without isolation from the broth to curdle milk in the improved process of the instant invention. However, it is preferred, since uniformity from batch to batch is better controlled, to isolate and purify the enzyme and to use the purified preparation in the cheesemaking step. To isolate the enzyme, the fermentation broths are filtered and the filter cake is washed with a small amount of deionized water. The filtrate and combined wash liquids are cooled and then are freeze dried; the solids isolated are found to assay from about 1:7,500 to 1:9,700 (the significance of the assay is discussed below). Further purification of the enzyme preparation is carried out by reconstituting the freeze dried solids in deionized water after which the enzyme is precipitated by the addition of about 2 volumes of acetone which previously has been cooled to about −25° C. The acetone-water solution is then decanted leaving behind a viscous, congealed precipitate. The precipitate is then resuspended in a small amount of water and is rapidly freeze dried. The process is repeated and the residue after freeze drying has an activity corresponding to about 1:45,000.

A further purification can be achieved by dissolving the enzyme preparation in water and dialyzing against water. This is preferably carried out in a refrigerator with cold water for at least about 4 days. The non-dialyzables are then freeze dried and are found to contain over 80% of the original activity; this represents at least about a two-fold purification. The final product is indicated to have an activity corresponding to about 1:100,000 units.

Of course, other methods of recovery, well within the skill of those versed in this art may be employed: for example, the water-soluble enzyme can be separated from the solution or filtrate by salting it out by adding some inorganic salt to the liquid, such as ammonium sulfate, exemplified below, or by the addition of a non-solvent such as ethanol, instead of acetone, to a concentration sufficiently high so as to cause precipitation of the enzyme.

With respect to the activity of the enzyme preparation of the instant invention, the activity units are related to the strength of standardized rennet powders and are determined by assay techniques involving milk-curdling time tests. The test methods are commonly used by those skilled in the art to determine the strength of rennet preparations. When a commercial rennet preparation is labeled 1:10,000, for example, it means that 1 g. will curdle 10 liters of sweet milk at 35° C. within 40 minutes. Rennet preparations are also commonly available at strengths of 1:100,000 and 1:7,600,000.

Electrophoretic data for the enzyme of this invention indicate that it has an ionic electric point of about 5.5. Thus in 0.25 M sodium acetate solution it shows no mobility at pH 5.5; and above pH 5.5 it migrates toward the anode. Furthermore, at pH 4.5 in 0.025 M sodium acetate on horizontal paper at a constant 250 volts and 8 milliamps, the instant enzyme migrates toward the negative electrode a distance of about 2.5 cms. during 5 hours. In contrast, crystalline animal rennin migrates only 0.55 cm. under the same conditions.

In the improved process of the instant invention, as applied to making Cheddar cheese, the standard techniques used in the cheese-making art may be employed substituting for the animal-source rennet extract usually employed, a substantially equivalent amount of the enzyme preparation derived from the organism of the instant invention. It is not necessary to change any of the other conditions for making cheese when the enzyme is used. The cheese obtained from the use of the improved step of the instant invention is fully equivalent in properties to that obtained when rennet extract is used.

The use of the enzyme preparation in the production of Cheddar cheese is exemplified in detail hereinafter. This procedure is based on commonly employed American cheesemaking techniques. See, for example, Prescott and Dunn, Industrial Microbiology, 3rd Edition, New York, McGraw-Hill Book Co., Inc., 1959, Chapter 21, "Cheese," and references cited therein. It is to be understood, however, that the instant invention contemplates improvements in the milk-curdling step common to all processes for making cheeses wherein rennet preparations have heretofore been used. Among the cheeses made in this manner are the so-called "hard" and "soft" cheeses and cottage cheese.

The quality of the cheeses made by the improved process of the instant invention are easily determined by taking samples at intervals during curing and evaluating them for texture, firmness, gas formation and flavor development. No evidence of undesirable protease activity is observed in cheeses made by the improved process of the instant invention. In Cheddar cheeses, the curd remains firm, shows no tendency to redissolve in whey, and is fully equivalent to that prepared with animal rennet. No off flavors or bitterness are observed to occur in the taste of the cheese during the cure. In contrast, when preparations of enzymes elaborated by other microorganisms or those from vegetable sources are used, it is observed that the firmness and texture of the cheese made therefrom deteriorate and that, usually within one month, off flavors and undesirable bitter tastes characteristic of continued proteolytic activity have developed.

The following examples are illustrative of the product and processes of the instant invention. It is to be understood that they define ways in which the improved process can be carried out but are not to be construed as limiting in any manner.

*Example I*

*Endothia parasitica*, ATCC 14729, is rinsed from a potato dextrose agar slant, under sterile conditions, into a flask containing one liter of the following aqueous inoculum medium in a 2.8-1. Fernbach flask (the medium has been previously sterilized in an autoclave for 45 minutes at 121° C.):

| | Per liter |
|---|---|
| N-Z Amine B [1] | g__ 5.0 |
| Soya protein digest [2] | g__ 2.0 |
| Yeast extract | g__ 2.0 |
| Soluble starch | g__ 10.0 |
| D-mannitol | g__ 5.0 |
| FeSO$_4$.7H$_2$O | mg__ 15.0 |
| Microelement solution [3] | ml__ 1.0 |

[1] Commercial hydrolyzed casein preparation.
[2] Commercial preparation, Soytone.
[3] Microelement solution: Fe[as Fe(NH$_4$)$_2$(SO$_4$)$_2$], 1.0 mg./ml.; Zn (as ZnSO$_4$), 1.0 mg./ml.; Mn (as MnSO$_4$), 0.50 mg./ml.; Cu (as CuSO$_4$), 0.08 mg./ml.; Co (as CoSO$_4$), 0.10 mg./ml.; B (as H$_3$BO$_3$), 0.10 mg./ml.

The flasks are incubated in a rotary shaker at 28° C. for 96 hours during which time a considerable amount of growth occurs.

An enzyme production medium is prepared and is sterilized in 2 liter portions in four-liter fermentation vessels by heating in an autoclave for one hour at 121° C. The medium has the following composition:

| | Grams/liter |
|---|---|
| Soybean meal | 30.0 |
| Cerelose (glucose) | 10.0 |
| NaNO$_3$ | 3.0 |
| Skim milk | 10.0 |
| KH$_2$PO$_4$ | 0.50 |
| MgSO$_4$.7H$_2$O | 0.25 |

The medium has a pH of about 6.8.

After cooling the growth medium to 28° C., 100 ml. of the inoculum is added to the vessel containing 2000 ml. of sterile growth medium and fermentation is carried out at 28° C. while air is introduced at the rate of 0.5 volumes of pair per volume of broth per minute and while the medium is agitated at 1700 r.p.m. After 48 hours, it is found that sufficient enzyme is present to enable 0.5 ml. of broth to curdle 5.0 ml. of sweet milk within 3 minutes. The final pH is about 6.0–6.5.

The enzyme is isolated by filtering the broth through a Buchner funnel precoated with a diatomaceous filter aid and the filter cake is washed with 100 ml. of deionized water. The combined washing water and filtrate are freeze dried and the freeze dried solids assay about 1:8000. The freeze dried solids are then reconstituted in deionized water to five times the original broth concentration and the solution is cooled to 1° C. During the cooling period and in all subsequent steps, nitrogen is flushed over the solutions and solids to aid in the exclusion of oxygen. Acetone, −25° C., is then added slowly, with stirring, to the enzyme solution until an amount equivalent to twice the original volume has been added. Toward the end of the addition of acetone, the precipitated enzyme becomes completely congealed. The acetone-water supernatant layer is decanted from the vessel leaving behind the viscous, congealed precipitate. Excess liquid is expressed from the cold solid by pressing with a spatula and the enzyme is further dried in a rapid stream of nitrogen. The precipitate is then suspended in an equal volume of water and is rapidly freeze dried; these solids contain 85% of the activity. A 15% (w./v.) aqueous solution of the purified freeze dried solids is prepared, cooled to 1° C. and a volume of acetone, cooled to −25° C., is added slowly, with stirring, until such an amount is added that congealing of the precipitate just begins. An amount of acetone is required approximately equivalent to 1.5 volumes of original solution. The precipitate is allowed to settle and the supernatant is decanted and to this is added slowly, with stirring, a volume of cold (−25° C.) acetone equivalent to 0.75 volume of the solution originally taken. The precipitate which forms is allowed to settle, the supernatant layer is decanted off, excess acetone is removed as hereinbefore described, the solids are dissolved in an equal volume of deionized water and are recovered by freeze drying. The freeze dried solids contain 40% of the original activity and assay about 1:45,000. This precipitate is dissolved in an equal volume of water and is dialyzed against cold tap water for 5 days. The dialysis apparatus itself is refrigerated during this time. The non-dialyzables are then freeze dried. The solid product has an activity assay value of 1:100,000.

A Cheddar cheese is made substituting for the animal-rennet preparation ordinarily used in the setting step, an equivalent amount of the enzyme preparation. The temperature of 1000 lbs. of pasteurized sweet milk is adjusted to 86–88° F. and 1 percent by weight of a cheesemaker's commercial lactic acid starter solution is added. The mixture is agitated for one hour then is adjusted to 88° F. and 3 ounces of the enzyme preparation dissolved in 120 ml. of deionized water is added and stirred in thoroughly. Agitation is stopped and, after 30 minutes, the firmness of the curd is tested by inserting a blunt instrument and raising it slowly whereupon the curd splits ahead of the instrument. The curd is cut into ¼-inch cubes with curd knives, then is stirred and, after 15 minutes, it is firmed by heating during 30 minutes from 88° F. to 100° F. The curd is stirred slowly during heating. The whey, which separates from the curd, is drained 2.25 hours after the enzyme preparation has been added. After the whey has been drained, the curd is ditched and packed then layered into slabs about 5 to 6 inches wide. The slabs are turned five times at 10 minute intervals then are repiled and the curd is milled. The temperature of the curd at milling is 98° F. The milled curd is spread evenly and is treated with 3 lbs. of flake cheesemaker's salt sprinkled over the surface. After the salt has dissolved in the curd, which requires about 30 minutes, the curd is transferred to hoops and the filled hoops are pressed for 30 minutes. The cloth covering on the outside of the hoop is adjusted and then the cheese is put back into the press and given a final pressing. This final pressing frees the rind of openings and of surface defects and requires about 24 hours. The cheese is then dried for four days at 55° F. then is coated with paraffin, is boxed and is cured at 75% relative humidity and 45° F. The plug sample taken when the cheese is three weeks old is free of mechanical openings and the cheese is free of acid flavor and bitterness. When the cheese is one month old, it has a firm, smooth waxy body and is free of mechanical openings, is free of unclean flavors and retains these properties until it is cured, which process requires 6 months to one year.

*Example II*

The procedure of Example I is repeated, substituting for *E. parasitica*, ATCC 14729, the strain of *E. parasitica* designated "CBS angera III" by Centralbureau voor Schimmelculture, Baarn, Holland. The milk-clotting potency appears to be somewhat higher than that of the strain of Example I. A satisfactory cheese is obtained.

*Example III*

The procedure of Example I is repeated, substituting for *E. parasitica*, ATCC 14729, the strain of *E. parasitica* designated "CBS Luino" by Centralbureau voor Schimmelculture, Baarn, Holland. The milk-clotting potency appears to be slightly higher than that of the strain of Example I. A satisfactory cheese is obtained.

*Example IV*

The procedure of Example I is repeated, substituting for *E. parasitica*, ATCC 14729, the strain of *E. parasitica* designated "CBS brescia" by Centralbureau voor Schimmelculture. A satisfactory cheese is obtained.

Example V

The procedure of Example I is repeated substituting for *E. parasitica*, ATCC 14729, the strain of *E. parasitica* designated "CMI No. 59815" by Commonwealth Mycological Institute, Kew, England. A satisfactory cheese is obtained.

Example VI

The procedure of Example I is repeated substituting, respectively, for *E. parasitica*, ATCC 14729, the strains designated 36 and 54 by Centralbureau voor Schimmelculture, Baarn, Holland. Satisfactory cheeses are obtained.

Example VII

In an alternative isolation procedure, the enzyme is separated from the broth prepared as described in Example I, as follows: the broth is filtered through a Büchner funnel precoated with a diatomaceous filter aid and the filter cake is washed with 100 ml. of deionized water. The combined wash water and filtrate are adjusted with dilute HCl to a pH of 4.5 and the solution is concentrated 15-fold in a vacuum at a temperature of 35°–40° C. To the stirred concentrated solution is added 40% by weight of anhydrous ammonium sulfate crystals. The enzyme, which precipitates, is collected by filtration. At this stage, it is eminently suitable for use in the production of cheese. It is then further purified by dialyzing for one day and freeze-drying the non-dialyzables. The freeze-dried solids are made up to a 15% solution in water and cooled to 0° C. There is then added acetone, which has previously been cooled to −15° C., in an amount sufficient to provide about two volumes of acetone based on the original solution. The enzyme deposits as tacky precipitate and the supernatant is decanted. The enzyme is then made up to a 15% solution in cold water and 5% of activated carbon, based on the total volume, is stirred in, then is removed by filtration after 45 minutes. The filtrate, containing the enzyme, is freeze-dried. The solids are made up in water to a 15% concentration and cooled to 0° C. Cold isopropanol (0° C.) is slowly added with stirring until the solution becomes opalescent. The suspension is removed to the refrigerator and kept until the crystalline enzyme has substantially completely deposited.

This crystalline enzyme with very high milk-clotting activity appears to be a polypeptide: after hydrolysis and resolution, the following amino acids are identified: cysteic, aspartic, threonine, serine, proline, glutamic, glycine, alanine, valine, isoleucine, leucine, phenylalanine, histidine, arginine, cystine and tyrosine.

What is claimed is:

1. A mildly proteolytic, milk-curdling enzyme which in crystalline form is a polypeptide yielding on hydrolysis the amino acids cysteic, aspartic, threonine, serine, proline, glutamic, glycine, alanine, valine, isoleucine, leucine, phenylalanine, histidine, arginine, cystine and tyrosine, and which is further characterized (a) by being water soluble; (b) by being non-dialyzable; (c) by having its milk-clotting ability destroyed by heating to about 60° C. for five minutes; (d) by having maximum stability at a pH of about 4.5; (e) by being precipitable from an aqueous solution thereof by ammonium sulfate; (f) by having an ionic electric point of about 5.5; and (g) by migrating a distance of about 2.5 cm. toward the anode when subjected to horizontal electrophoresis in 0.025 M sodium acetate at pH 4.5 at a constant 250 volts and 8 milliamps for five hours.

2. A process for producing the mildly proteolytic, milk-clotting enzyme of claim 1 which comprises inoculating a medium containing sources of carbohydrates, nitrogen and inorganic salts with a fungus of the species *Endothia parasitica*, allowing aerobic fermentation to take place until a substantial amount of said enzyme is produced, and thereafter recovering the so produced enzyme from the fermentation medium.

3. In a process for making cheese including the step of preparing curds from milk, the improvement which comprises substituting for at least part of the rennin in said step the milk-clotting enzyme elaborated by a strain of *Endothia parasitica*.

References Cited by the Examiner
UNITED STATES PATENTS

| | | | |
|---|---|---|---|
| 1,391,219 | 9/1921 | Takamine et al. | 99—116 |
| 2,848,371 | 8/1958 | Yoshida | 195—62 |
| 2,927,060 | 3/1960 | Oringer | 195—66 |
| 3,151,039 | 9/1964 | Arima et al. | 195—62 |

A. LOUIS MONACELL, *Primary Examiner.*

D. M. STEPHENS, *Assistant Examiner.*